(12) United States Patent
Herle

(10) Patent No.: US 10,707,489 B2
(45) Date of Patent: Jul. 7, 2020

(54) HIGH SOLIDS CONTENT PASTE FORMULATIONS FOR SECONDARY BATTERY ELECTRODE

(71) Applicant: APPLIED MATERIALS, INC., Santa Clara, CA (US)

(72) Inventor: Subramanya P. Herle, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 54 days.

(21) Appl. No.: 15/514,299

(22) PCT Filed: Sep. 25, 2015

(86) PCT No.: PCT/US2015/052374
§ 371 (c)(1),
(2) Date: Mar. 24, 2017

(87) PCT Pub. No.: WO2016/049539
PCT Pub. Date: Mar. 31, 2016

(65) Prior Publication Data
US 2017/0288232 A1    Oct. 5, 2017

Related U.S. Application Data

(60) Provisional application No. 62/056,353, filed on Sep. 26, 2014.

(51) Int. Cl.
*H01B 1/22* (2006.01)
*H01M 4/00* (2006.01)
(Continued)

(52) U.S. Cl.
CPC .............. *H01M 4/622* (2013.01); *H01B 1/22* (2013.01); *H01M 4/139* (2013.01); *H01M 4/583* (2013.01); *H01M 4/625* (2013.01); *H01M 4/0414* (2013.01)

(58) Field of Classification Search
CPC ... H01B 1/00; H01B 1/16; H01B 1/22; C09D 5/24
See application file for complete search history.

(56) References Cited

U.S. PATENT DOCUMENTS 5,856,044 A    1/1999  McLin et al.
8,753,443 B1   6/2014  Keuk et al.
(Continued)

FOREIGN PATENT DOCUMENTS

EP    2835850 A1    2/2015
JP    10-334886 A   12/1998
(Continued)

OTHER PUBLICATIONS

English language machine translation of JP 2010-061931 A (pub Mar. 18, 2010). (Year: 2010).*
(Continued)

*Primary Examiner* — Mark Kopec
(74) *Attorney, Agent, or Firm* — Pillsbury Winthrop Shaw Pittman LLP

(57) ABSTRACT

A high solids content paste for fabrication of secondary battery electrodes may comprise: a negative active material or a positive active material; a binder; a solvent; and a hyperdispersant; wherein the high solids content paste has a specific viscosity chosen for a particular coating tool and a composition such that the high solids content paste will maintain a deposited shape after coating at least until the high solids content paste has dried and wherein the dry coating thickness is in the range of 5 microns to 300 microns. The high solids content paste with negative active material has a viscosity in the range of 30,000 cP to 45,000 cP and a corresponding density of 1.40 g/cc to 1.43 g/cc. The high solids content paste with positive active material has a (Continued)

viscosity in the range of 25,479 cP to 47,184 cP and a corresponding density of 2.72 g/cc to 2.73 g/cc.

14 Claims, 8 Drawing Sheets

(51) Int. Cl.
*H01M 4/62* (2006.01)
*H01M 4/139* (2010.01)
*H01M 4/583* (2010.01)
*H01M 4/04* (2006.01)

(56) References Cited

U.S. PATENT DOCUMENTS

| | | | |
|---|---|---|---|
| 2009/0152509 A1 | 6/2009 | Choi et al. | |
| 2009/0155678 A1* | 6/2009 | Less | H01M 2/1673 429/144 |
| 2009/0305052 A1 | 12/2009 | Handl | |
| 2013/0157105 A1 | 6/2013 | Picard et al. | |
| 2017/0179478 A1* | 6/2017 | Bruckmeier | H01M 4/134 |

FOREIGN PATENT DOCUMENTS

| | | |
|---|---|---|
| JP | 2010-061931 A | 3/2010 |
| JP | 2011-181229 A | 9/2011 |
| JP | 2013-073724 A | 4/2013 |
| JP | 2013-149416 A | 8/2013 |
| WO | 2012/133031 A | 10/2012 |
| WO | 2013150778 A1 | 10/2013 |

OTHER PUBLICATIONS

Coatings (Encyclopedia of Polymer Science and Technology) 2007, 74 pages. (Year: 2007).*

Lubrizol Hyperdispersants product sheet, lubrizolcoatings.com May 2008 (Year: 2008).*

Rondet et al "Fractal formation description of agglomoration in low shear mixer", Chemical Engineering Journal 164 (2010) 376-382.*

Extended European Search Report dated Apr. 20, 2018 for EP Patent Application No. 15843274.0.

Lubrizol, "Dispersants Product Guide," Jan. 1, 2017; available at: https://www.lubrizol.com; 15 pages.

Lubrizol, "Solsperse 2000," technical data sheet, Dec. 13, 2017, available at: https://www.lubrizol.com; 2 pages.

Lubrizol, "Solsperse 2700," technical data sheet, Dec. 14, 2017, available at: https://www.lubrizol.com; 2 pages.

Schofield, J.D., "Extending the boundaries of dispersant technology," Progress in Organic Coatings, vol. 45, No. 2-3, Oct. 1, 2002, pp. 249-247.

Ohta, S., et al., "All-solid-state lithium ion battery using garnet-type oxide and $Li_3BO_3$ solid electrolytes fabricated by screen-printing," Journal of Power Sources 238 (2013) pp. 53-56.

Lee, Seung-Tae et al., "The production of $LiCoO_2$ cathode thick films for an all-solid state microbattery," Journal of Ceramic Processing Research, vol. 8, No. 2, (2007), pp. 106-109.

Park, Sung-Chul, et al., "Electrochemical Properties of $LiCoO_2$-Coated $LiMn_2O_4$ Prepared by Solution-Based Chemical Process," Journal of the Electrochemical Society, vol. 148, No. 7, (2001), pp. A680-A686.

"CoEx for Structured Battery Electrodes: Novel co-extrusion printing technique significantly improves battery performance," published by PARC, a Xerox Company; available at www.parc.com/content/attachments/coex_battery_parc.pdf; publication date unknown; 2 pages; last viewed Mar. 28, 2017.

Zhao, Yaomin et al., "A Novel and facile route of ink-jet printing to thin film $SnO_2$ anode for rechargeable lithium ion batteries," Electrochimica Acta, vol. 51, No. 13, (2006), pp. 2639-2645.

Japanese Intellectual Property Office, Office Action in corresponding Japanese application No. 2017-516439, Jul. 30, 2019, pp. 1-4.

Japanese Intellectual Property Office, Office Action in corresponding Japanese application No. 2017-516439, dated May 19, 2020, pp. 1-5.

* cited by examiner

US 10,707,489 B2

HIGH SOLIDS CONTENT PASTE FORMULATIONS FOR SECONDARY BATTERY ELECTRODE

CROSS REFERENCE TO RELATED APPLICATIONS

This application is a U.S. National Phase patent application of PCT/US2015/052374, filed Sep. 25, 2015, which claims priority to U.S. Provisional Application No. 62/056,353 filed Sep. 26, 2014, both of which are hereby incorporated by reference in the present disclosure in their entirety herein.

FIELD

Embodiments of the present disclosure relate generally to electrochemical energy storage devices such as batteries, and more specifically, although not exclusively, to high solids content paste formulations for secondary battery electrodes.

BACKGROUND

Conventional battery electrodes are fabricated, for example, using a slurry consisting of active materials with a suitable binder and carbon additive, which is coated on thin metal foil current collectors, using a slot-die tool. The electrodes are dried, calendered and cut to size to make wound or stacked cells. To avoid cracking of the coating, especially thicker coatings, the coatings need to be dried very slowly. Also, slot die pattern coating processes deposit extra material at the lead and end edges of the coating causing coating uniformity issues.

Clearly, there is a need for faster drying of coatings and also improved coating uniformity, from the cost and yield perspective.

SUMMARY

According to some embodiments, a high solids content paste for fabrication of secondary battery electrodes may comprise: an active material chosen from the group consisting of a negative active material and a positive active material; a binder; a solvent; and a hyperdispersant; wherein the high solids content paste has a specific viscosity chosen for a particular coating tool and a composition such that the high solids content paste will maintain a deposited shape after coating at least until the high solids content paste has dried and wherein the dry coating thickness is in the range of 5 microns to 300 microns. In embodiments, the high solids content paste is formulated for use to form a sintered sheet comprising positive active material for use as a substrate for electrochemical energy storage device fabrication; the sintered sheet of positive active material has a thickness in the range of 3 microns to 260 microns, and in some embodiments a thickness in the range of 10 microns to 60 microns.

According to some embodiments, a method of preparing a high solids content paste for fabrication of secondary battery electrodes may comprise: providing an active material chosen from the group consisting of a negative active material and a positive active material; wetting the active material to form wetted active material; providing a binder and a solvent; combining the binder with solvent to form a viscous binder mixture; combining in a low shear mixer the wetted active material and the viscous binder mixture to form a paste; providing a hyperdispersant; and adding the hyperdispersant to the paste, to form the high solids content paste with a specific viscosity.

According to some embodiments, a method of preparing a high solids content paste for fabrication of secondary battery electrodes may comprise: providing an active material chosen from the group consisting of a negative active material and a positive active material; solid phase mixing of the active material to form a solids mixture; providing a binder and a solvent; combining the solids mixture with the binder and the solvent to form a paste; providing a hyperdispersant; and adding the hyperdispersant to the paste, to form the high solids content paste with a specific viscosity.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Embodiments of the present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present disclosure, an embodiment showing a singular component should not be considered limiting; rather, the disclosure is intended to encompass other embodiments including a plurality of the same component, and vice-versa, unless explicitly stated otherwise herein. Moreover, it is not intended for any term in the present disclosure to be ascribed an uncommon or special meaning unless explicitly set forth as such. Further, the present disclosure encompasses present and future known equivalents to the known components referred to herein by way of illustration.

Figure 1:
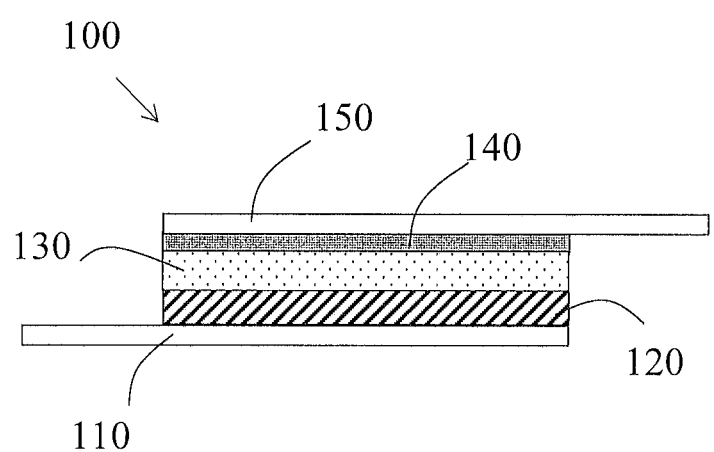
FIG. 1 is a schematic cross-sectional representation of a battery, according to some embodiments.

The present disclosure describes an electrochemical energy storage device, such as a battery, which may comprise a positive electrode and a negative electrode separated by a separator and an electrolyte which acts as an ionic conductive matrix, wherein a high solids content paste is used for making: the negative electrode; the positive electrode; and/or a sintered substrate on which the electrochemical energy storage device may be fabricated. A cross-sectional representation of an example of an energy storage device 100 is shown in FIG. 1, with a positive current collector 150, a positive electrode with active material (with or without binder and carbon black), and liquid/polymer/gel/solid electrolyte 140, a solid state electrolyte separator 130 such as a ceramic Li-ion conducting film, a negative electrode 120 and a negative current collector 110. Note in FIG. 1 that the current collectors are shown to extend beyond the stack, although it is not necessary for the current collectors to extend beyond the stack. The portions extending beyond the stack may be used as tabs for making electrical connection to the cell.

Negative active materials are incorporated into pastes for forming negative electrodes, and positive active materials are incorporated into pastes for forming positive electrodes.

A negative active material is a material that "intercalates" or "reacts" with alkali metal/ions at low voltage. For example, if the alkali metal is lithium, Li ion intercalation into graphite is at an average of 0.2 V with respect to Li/Li+ potential. Silicon and tin are examples of negative active materials that "alloy" with Li at an average of 0.4 V and 0.6 V, respectively, Another practical example is $Li_4Ti_5O_{12}$ spinel with an average of 1.5 V with respect to $Li/Li^+$.

A positive active material is a material that "intercalates" or "reacts (sometimes called conversion reaction)" with alkali metal/ions at high voltage. For example, if the alkali metal is lithium, Li-ion de-intercalation from $LiCoO_2$ is taking place at around 4 V, from $LiFePO_4$ at 3.4 V, etc. Further lithium-based materials examples include: layered oxides such as Co doped $LiNiO_2$, Nickel doped $LiMn_2O_4$, $Li_2FeSiO_4$, $LiMO_2$ (M=mixture of Li, Mn, Co, Ni), $LiM_2O_4$ (M=Ni, Mn), etc. Other examples include materials such as $MnO_2$, $V_2O_5$, S, $BiF_3$, etc. which "intercalate" Li or undergo a conversion reaction with Li.

The high solids content paste used for forming the negative and positive electrodes may comprise a negative/positive active material, a binder, a solvent and a hyperdispersant, and in embodiments may further comprise carbon to improve electrical conductivity. In some embodiments, the method of making the electrode may be by a patterning process exhibiting uniform coatings with clean edges, such as screen printing, and wherein the coating can be dried rapidly (which is drying faster than a slurry due to the lower solvent content and also due to drying at a higher temperature than a slurry—the latter is possible since macro-cracking is not as prevalent due to the lower solvent content of the paste compared to the slurry) without compromising coating quality. The electrode coating (dry) in embodiments is in the range of 5 microns to 300 microns thick and in further embodiments in the range of 10 microns to 75 microns thick. Furthermore, the viscosity of the paste may be controlled to be sufficient for the deposited paste to maintain its shape as deposited at least through the drying process. In some embodiments, the high solids content paste may be a water-based graphite paste with a viscosity in the range of 30,000 cP to 45,000 cP and a corresponding density of 232 to 2.73 g/cc, and in further embodiments the high solids content paste may be an organic solvent based lithium cobalt oxide paste with a viscosity in the range of 25,479 cP to 47,184 cP and a corresponding density of 2.72 to 2.73 g/cc. The high solids content paste may be formulated for long shelf life, for example in embodiments a shelf life of 6 to 9 months, in other embodiments a shelf life of 9 to 12 months and in further embodiments greater than 12 months. Herein shelf life is the time during which there is no appreciable separation, sedimentation or coagulation of component parts in the paste.

Figure 2:
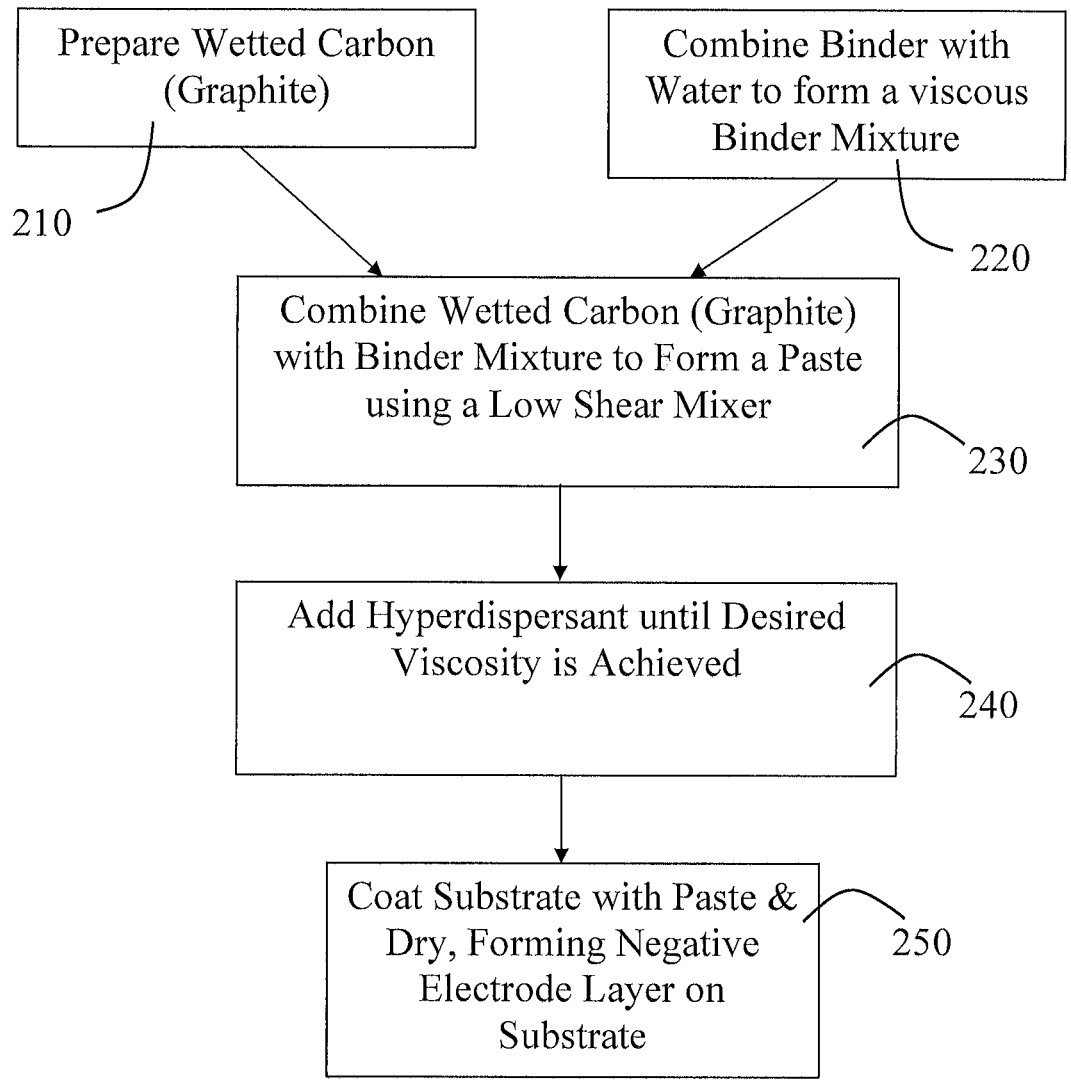
FIG. 2 is a process flow for making an electrode from a water-based negative active material-containing high solids content paste, according to some embodiments.
Figure 3:
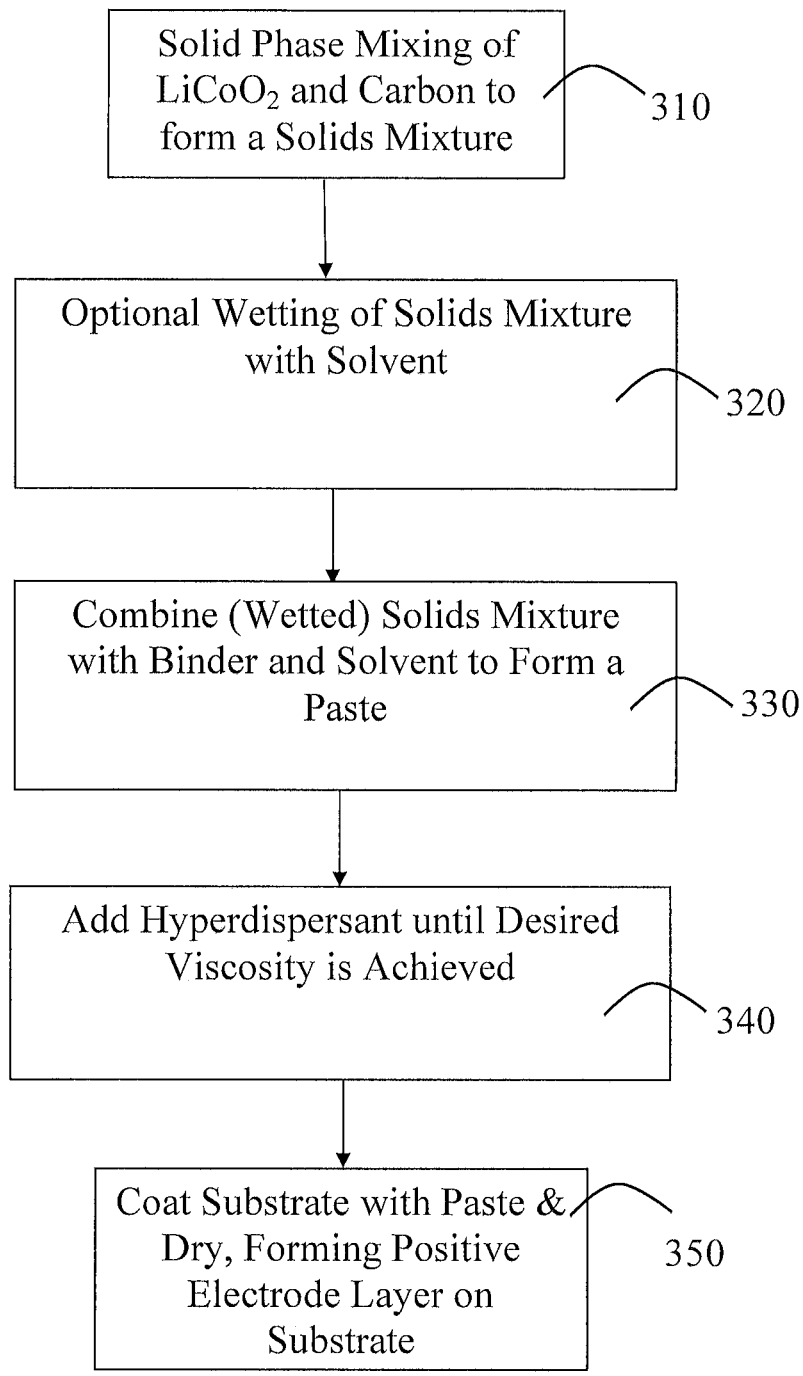
FIG. 3 is a process flow for making an electrode from an organic solvent-based positive active material-containing high solids content paste, according to some embodiments.

FIGS. 2 & 3 show example process flows for preparation of high solids content pastes, and formation of electrodes from the pastes, according to embodiments. Although, the examples shown in FIGS. 2 & 3 are specific to pastes with negative active material and positive active material for forming negative and positive electrodes, respectively, these flows may be used more generically for both negative and positive active materials and using appropriate solvents (water and/or organic solvents), binders, dispersants, etc.

In FIG. 2, the process of forming a negative electrode comprises: wetting a negative active material such as carbon (graphite) solids (210); the binder is combined with a solvent (water) to form a viscous binder mixture (220); the wetted carbon is combined with the binder mixture to form a paste using a low shear mixer (230); a hyperdispersant is added to provide a paste with a specific viscosity (determined by the coating tool) (240); and a substrate is coated with the paste and dried to form a negative electrode layer on the substrate (250). Note that in embodiments, pre-wetting of the carbon material may be unnecessary, and all dry solids may be combined and mixed with water. Coating may be by screen printing, and drying may be in an oven, linear furnace, or similar.

In FIG. 3, the process for forming a positive electrode comprises: solid phase mixing of a positive active material, such as $LiCoO_2$, and carbon material (used to provide electrical conductivity, but not a negative active material) to form a solids mixture (310); optionally wetting the solids mixture with solvent (an organic solvent) (320); combining the (wetted) solids mixture with binder solids and solvent to form a paste (330); a hyperdispersant is added to provide a paste with a specific viscosity (determined by the coating tool) (340); and a substrate is coated with the paste and dried to form a negative electrode layer on the substrate (350). Note that in embodiments, the binder dry solids may be combined with solvent to form a viscous binder mixture before combining with the (wetted) solids mixture. Coating may be by a screen printer, and drying may be in an oven, linear furnace, or similar. Note in some embodiments, carbon material is not included in the paste—as described below, material may be added to the sintered layer after firing if the electrical conductivity of the sintered layer needs to be increased.

Figure 4:
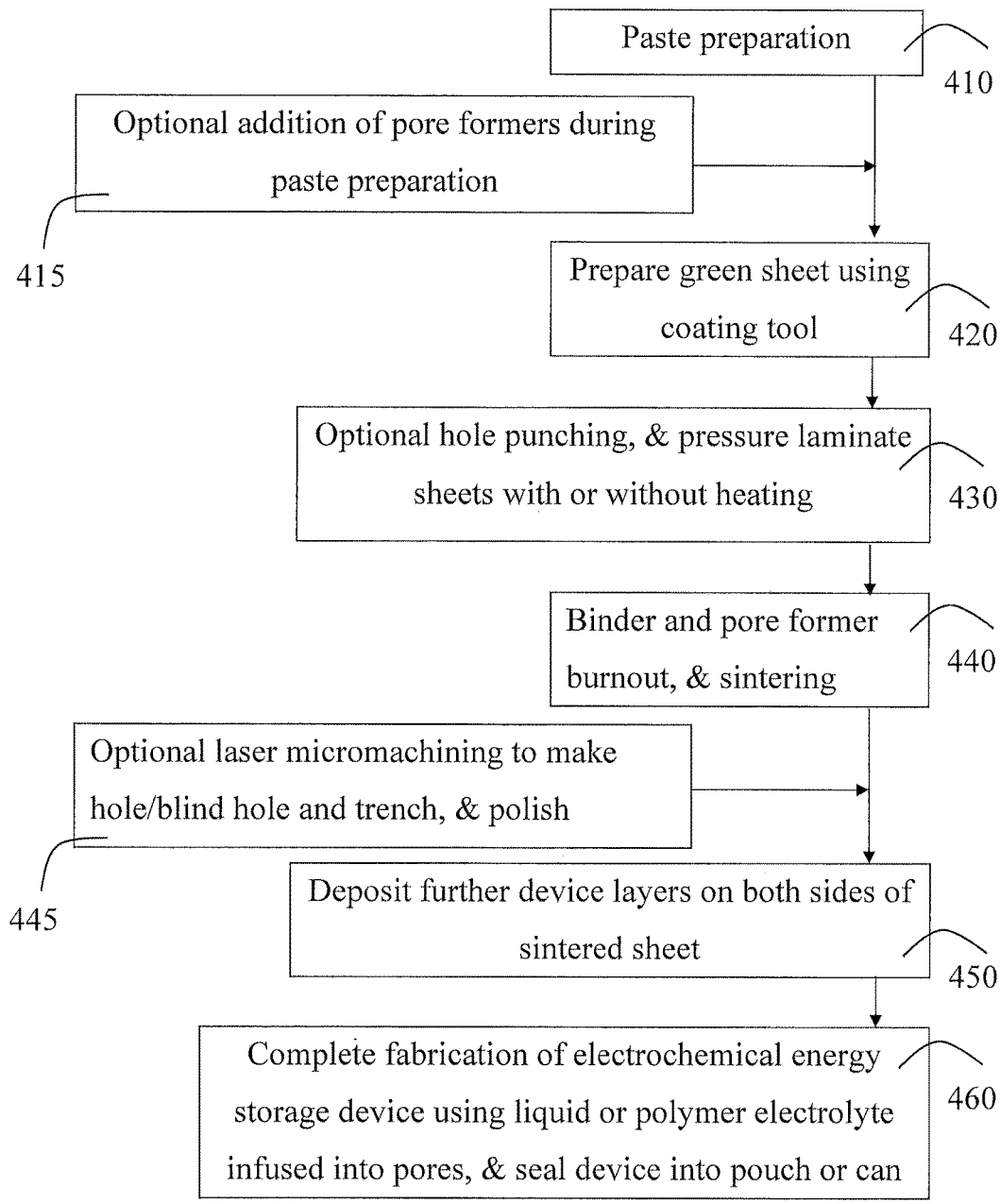
FIG. 4 is a process flow for making an electrochemical energy storage device, according to some embodiments.

Furthermore, the teaching and principles of the present disclosure are applicable to a process for making a sintered green sheet as a substrate for electrochemical energy storage devices. FIG. 4 shows a process according to some embodiments for making green tape using a high solids content slurry based approach and burning out of organic materials completely to form a sintered body of active material. This sintered green tape may be used as a substrate to deposit other active and inactive cell components to maximize active material volume fraction in the end device. In FIG. 4, the process comprises: positive active material solids such as $LiCoO_2$, cobalt doped $LiNiO_2$, Ni doped $LiMn_2O_4$ etc. with particle sizes in the range of 500 nm to 15 vim, and in embodiments particle sizes in the range of 1 μm to 5 μm, are wetted in water (410); the acrylic water based binder solution is combined with de-ionized water, a defoamer and a modifier to form a viscous mixture (410); the wetted positive active material is combined with the binder mixture to form a paste using a low shear mixer; a dispersant is added to provide a paste with a specific viscosity (determined by the coating tool) (420); and a substrate is coated with the paste and dried to form a positive electrode layer green tape on the substrate (420). The positive electrode green tape can also consist of pore formers such as polymethyl methacrylate (PMMA) beads in the paste formulation (415). Note that in embodiments, pre-wetting of the positive active material may be unnecessary, and all dry solids may be combined and mixed with water. In certain embodiments non-aqueous, but polar, solvents such as alcohol can be used in place of water for active materials that have stability issues when mixed with water. Coating may be by a slot-die, screen printer, and organic matter burnout may be in an oven or linear furnace in the temperature range from 100° C. to 400° C., and in embodiments in the temperature range from 250° C. to 350° C., under atmospheric pressure and either air or oxygen ambient. The total loss of organic matter may range from 5 wt. % to 20 wt. %.

Figure 10:
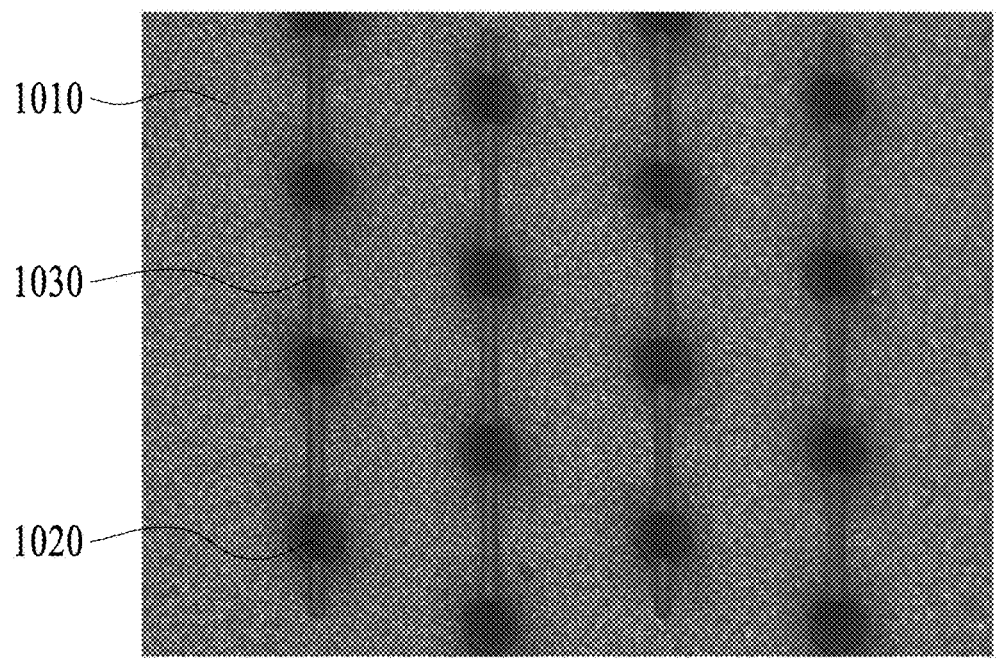
FIG. 10 is an optical micrograph of a patterned, sintered LCO sheet, according to some embodiments.

Before drying, the green tape can be punched and several sheets can be laminated together to form the desired device architecture. The pores can be engineered to help device integration and in one embodiment a layer of positive active green tape may be sintered with a layer of green tape with pore former or a dense green tape layer as a cup filled with a porous layer within the cup architecture (pores in the cup architecture may be filled with liquid electrolyte). The lamination can be done at 60° C. to 80° C. at 3000 psi to 6000 psi pressure (430). The binder and pore former is burnt out to form a dense sintered positive active material (440). The sintering temperature may be in a range from 600° C. to 1200° C., and in embodiments in a range from 950° C. to 1150° C. to limit the $Li_2O$ loss during sintering; furthermore, the dwell time at temperature may vary from 1 second to 6 hours, and in embodiments below 1 hour. Alternatively, the green sheet can be arc plasma sintered after organic burn-out to get the sintered sheet. A thick LCO pellet can be sintered by arc plasma/arc sintering and then sliced into thin sheets. The active material crystallites can be oriented during sintering by a suitable magnetic field or controlled crystal growth. The sintered sheet can be micromachined to form through/blind holes, trenches and patterns. (445) The surface of the sintered sheet can be polished to remove debris and achieve good surface smoothness. (445) For example, a 180 micron thick sintered LCO sheet 1010 was micromachined to form a regular array of 100 micron diameter blind tapered holes 1020 (about 80% through the sheet), spaced 300 microns apart, and having trenches 1030 on the surface of the sheet which connect rows of holes, the trenches being about 2 microns deep and 50 microns wide and the trenches being formed in parallel. In embodiments in which the top surface of the sintered sheet (with pores) is covered by another layer of material the trenches provide a connection to the pores to enable filling the pores with liquid or polymer/gel electrolyte at the end of the process for forming an electrochemical energy storage device, for example. See FIG. 10 which shows a magnified view of a portion of such a micromachined sheet.

The sintered sheet can be used as a substrate for the deposition of other active or inactive cell components such as an electrolyte (deposited on the porous surface of the sintered sheet), a negative electrode layer (Li or other alkali metal, for example) (on the non-porous surface of the sintered sheet) and current collectors for the positive and negative electrodes. (450) The electrochemical energy storage device may be completed by infusing liquid or polymer gel electrolytes into the pores/positive electrode, if needed, and sealing the device in a pouch or can. (460) Note that if improved electrical conductivity is desired for the sintered sheet, electrically conductive material may be incorporated into the sintered sheet.

EXAMPLES

The examples set forth herein below are illustrative of different paste compositions. However, it will be apparent that the present embodiments can be practiced with many types of compositions and can have many different uses in accordance with the disclosure.

Example 1

In embodiments, an example of the water-based high solids paste comprising carbon (graphite) may be prepared using the process flow of FIG. 2, described above. The specific composition and physical properties are provided in Table 1. Natural graphite (energy grade material) is a specific example of a carbon (graphite) containing material. Carboxyl-methyl-cellulose (CMC) MW 90,000 is a specific example of a binder material. Solsperse® 27000 is an example of a hyperdispersant used to fine tune the viscosity of the paste.

TABLE 1

Water-based high solids paste comprising graphite and CMC binder.

| PARAMETERS | EXAMPLE 1 | |
|---|---|---|
| Viscosity[a] | 40,971 cP | |
| Formulation | Natural graphite | 51.3 wt. % |
| | distilled water | 40.81 wt. % |
| | CMC | 1.89 wt. % |
| | Solsperse ® 27000 | 6.0 wt. % |
| Density[b] | 1.40 g/cm$^3$ | |

[a]Brookfield Dial Reading Viscometer Model HBT, spindle CPE-52 at 10 s$^{-1}$ at 25° C.
[b]Ink/Paste Density Cup at 20° C.

Example 2

In embodiments, a further example of the water-based high solids paste comprising carbon (graphite) may be prepared using the process flow of FIG. 2, described above. The specific composition and physical properties are provided in Table 2. Natural graphite (energy grade material) is a specific example of a carbon (graphite) containing material. Hydroxy-ethyl-cellulose is a specific example of a binder material. Solsperse® 27000 is an example of a hyperdispersant used to fine tune the viscosity of the paste.

TABLE 2

High solids paste comprising graphite and hydroxyl-ethyl-cellulose binder.

| PARAMETERS | EXAMPLE 2 | |
|---|---|---|
| Viscosity[a] | 13,762 cP | |
| Formulation | Natural graphite | 50.5 wt. % |
| | distilled water | 44.5 wt. % |
| | hydroxy-ethyl-cellulose | 1.9 wt. % |
| | Solsperse ® 27000 | 2.9 wt. % |
| Density[b] | 1.43 g/cm$^3$ | |

[a]Brookfield Dial Reading Viscometer Model HBT, spindle CPE-52 at 10 s$^{-1}$ at 25° C.
[b]Ink/Paste Density Cup at 20° C.

Example 3

In embodiments, a yet further example of the water-based high solids paste comprising carbon (graphite) may be prepared using the process flow of FIG. 2, described above. The specific composition and physical properties are provided in Table 3. Natural graphite (energy grade material) is a specific example of a carbon (graphite) containing material. Hydroxy-ethyl-cellulose, CMC (MW 90,000) and poly-methyl-methacrylate/poly-ethyl-methacrylate are specific examples of binder materials. Solsperse® 27000, a polymeric dispersant available from Lubrizol Ltd., is an example of a hyperdispersant used to fine tune the viscosity of the paste.

TABLE 3

Water-based high solids paste comprising graphite and CMC, hydroxyl-ethyl-cellulose and PMMA/PEMA binders.

| PARAMETERS | EXAMPLE 3 | |
|---|---|---|
| Viscosity[a] | 34,444 cP | |
| Formulation | Natural graphite | 61.1 wt. % |
| | Distilled Water | 27.2 wt. % |
| | CMC | 1.6 wt. % |
| | Hydroxy-ethyl-cellulose | 1.8 wt. % |
| | PMMA/PEMA | 2.3 wt. % |
| | Solsperse ® 27000 | 6.0 wt. % |
| Density[b] | 1.37 g/cm$^3$ | |

[a]Brookfield Dial Reading Viscometer Model HBT, spindle CPE-52 at 10 s$^{-1}$ at 25° C.
[b]Ink/Paste Density Cup at 20° C.

Example 4

In embodiments, an example of the organic solvent-based high solids paste comprising $LiCoO_2$ may be prepared using the process flow of FIG. 3, described above. The specific composition and physical properties are provided in Table 4. Polyvinylidene fluoride (PVDF) Kynar® 761 is an example of a binder material, Super P®, available from TIMCAL Graphite & Carbon Ltd., is an example of a conductive carbon black containing material. Solsperse® 20000, a polymeric dispersant available from Lubrizol Ltd., is an example of a hyperdispersant used to fine tune the viscosity of the paste.

TABLE 4

A first example of the organic solvent based high solids paste comprising carbon black and $LiCoO_2$.

| PARAMETERS | EXAMPLE 4 | |
|---|---|---|
| Viscosity[a] | 47,184 cP | |
| Formulation | LiCoO$_2$ (energy grade material) | 79.51 wt. % |
| | PVDF | 0.82 wt. % |
| | Super P ® | 0.42 wt. % |
| | 1-methyl-2-pyrrolidone | 7.18% |
| | Solsperse ® 20000 | 12.06 wt. % |
| Density[b] | 2.73 g/cm$^3$ | |

[a]Brookfield Dial Reading Viscometer Model HBT, spindle CPE-52 at 10 s$^{-1}$ at 25° C.
[b]Ink/Paste Density Cup at 20° C.

Example 5

In embodiments, a further example of the organic solvent-based high solids paste comprising $LiCoO_2$ may be prepared using the process flow of FIG. 3, described above. The specific composition and physical properties are provided in Table 5. Polyvinylidene fluoride (PVDF), Kynar® 761 is an example of a binder material. Super Pt, available from TIMCAL Graphite & Carbon Ltd., is an example of a conductive carbon black containing material. Solsperse® 20000, a polymeric dispersant available from Lubrizol Ltd., is an example of a hyperdispersant used to fine tune the viscosity of the paste.

TABLE 5

A second example of the organic solvent based high solids paste comprising carbon black and $LiCoO_2$.

| PARAMETERS | EXAMPLE 5 | |
|---|---|---|
| Viscosity[a] | 25,479 cP | |
| Formulation | LiCoO2 (energy grade material) | 79.56 wt. % |
| | PVDF | 0.82 wt. % |
| | Super P ® | 0.37 wt. % |
| | 1-methyl-2-pyrrolidone | 7.17% |
| | Solsperse ® 20000 | 12.07 wt. % |
| Density[b] | 2.72 g/cm$^3$ | |

[a]Brookfield Dial Reading Viscometer Model HBT, spindle CPE-52 at 10 s$^{-1}$ at 25° C.
[b]Ink/Paste Density Cup at 20° C.

Characterization of High Solids Content Pastes

Of the high solids pastes from Examples 1-5, it is expected that Examples 1, 3, 4 and 5 will exhibit a shelf life of weeks, and potentially months—for example 6 to 9 months, in embodiments 9 to 12 months and in further embodiments greater than 12 months—at room temperature without any deleterious separation/sedimentation/coagulation of solids in the pastes. Example 2 exhibited sedimentation after only 24 hours so would require preparation shortly before use.

The high solids formulation of Example 3 was used to screen print an approximately 100 micron thick graphite electrode comprising 2 cm×2 cm squares on a copper substrate. Mass loading test across the screen printed electrode showed good screen printing results using the paste according to the present disclosure and adhesion tests (Scotch® Tape test and 180 degree peel test at approximately 0.2N/cm in an Instron® electromechanical test frame) were indicative of a satisfactorily robust electrode.

SEM examination of an electrode screen printed using the water-based graphite-containing paste of Example 3 showed no evidence of macro-cracking; the dried electrode is approximately 120 microns thick and was dried at 130° C. Herein macro-cracking refers to the "mud-crack" type of cracks which run from top to bottom through the electrode layer (roughly perpendicular to the plane of the substrate). Note that the presence of macro-cracking would be expected to result in poor adhesion of the electrode film to the substrate.

Figure 5:
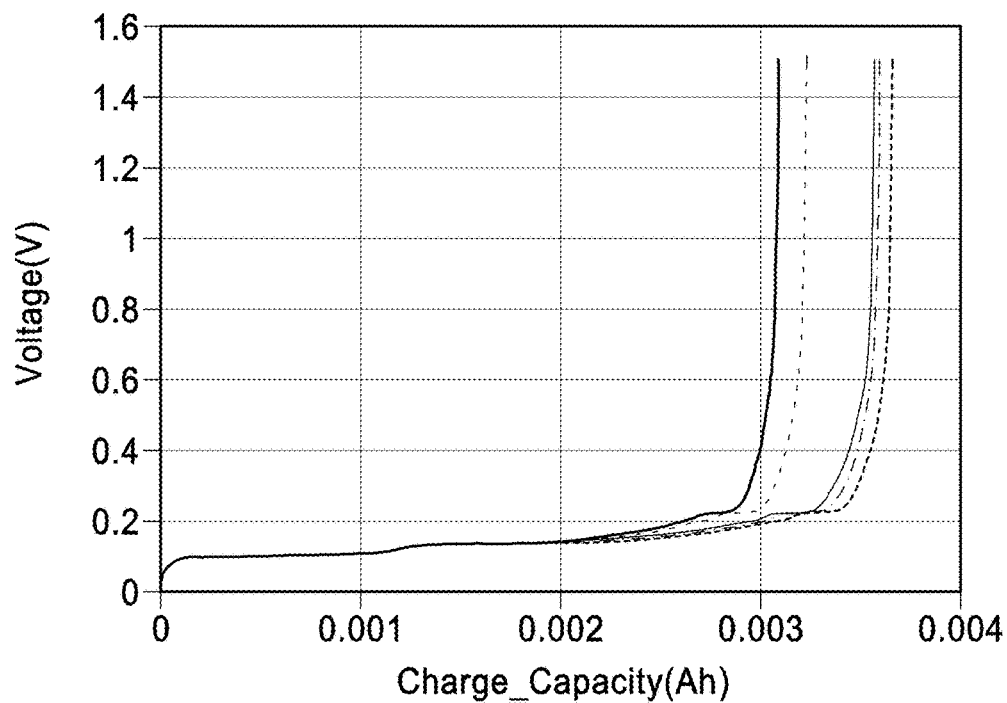
FIGS. 5 & 6 are charge and discharge curves, respectively, for a cell including an electrode fabricated according to some embodiments.
Figure 6:
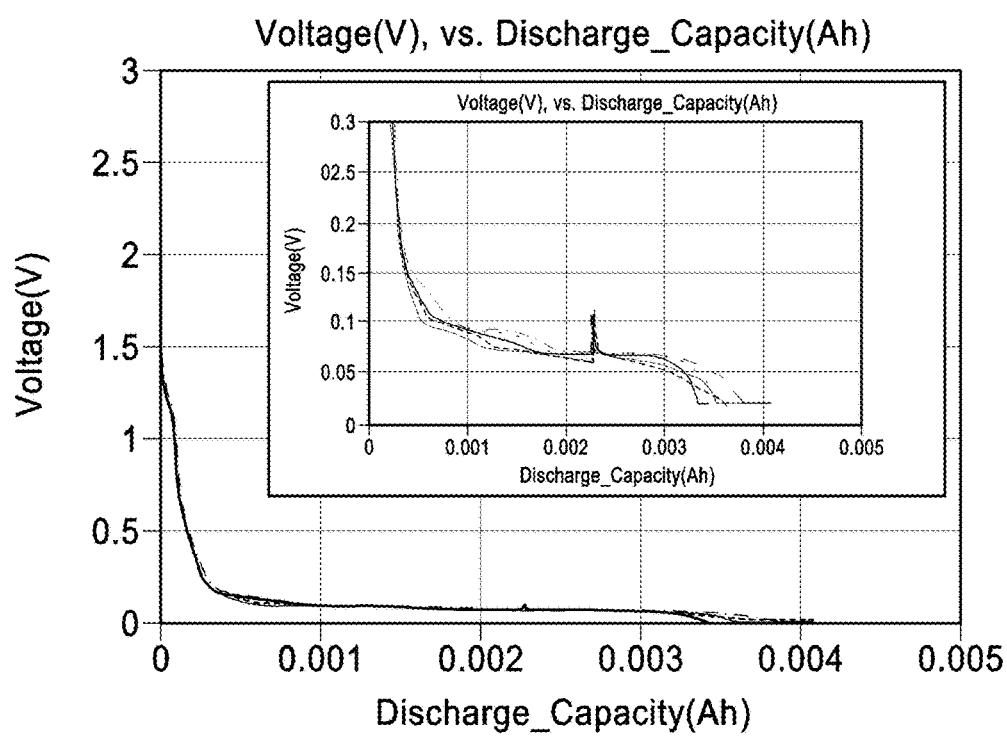
Figure 7:
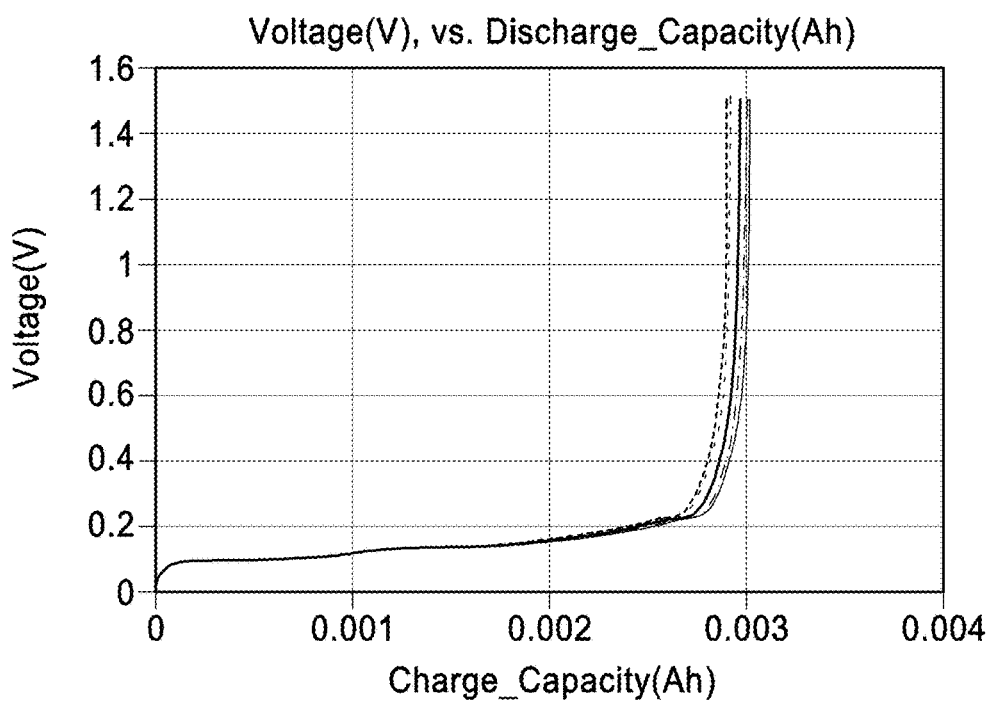
FIGS. 7 & 8 are charge and discharge curves, respectively, for a control cell.
Figure 8:
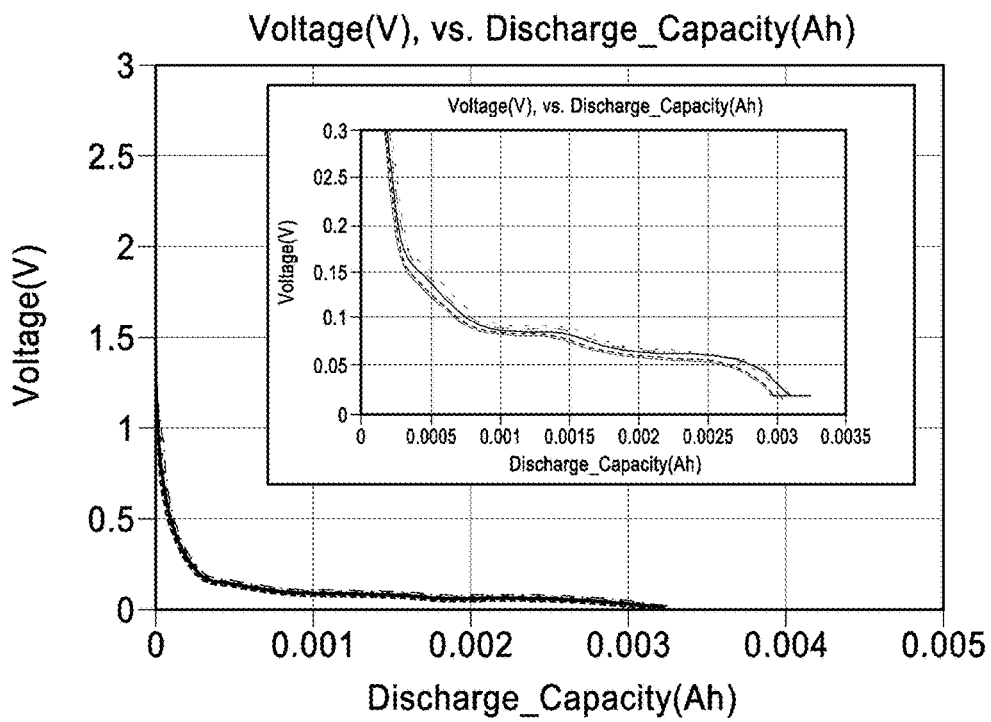

FIGS. 5 & 6 are charge and discharge curves, respectively, for a battery cell including an electrode screen printed using the water-based graphite-containing paste of Example 3. The Initial Cycle Loss (ICL) data for this cell is provided below in Table 6. This data compares favorably with the charge and discharge curves, respectively, for a battery cell including an electrode fabricated using a slot die process with a commercially available slurry containing the same carbon solids used in Example 3—see FIGS. 7 & 8. The Initial Cycle Loss (ICL) data for this control cell is provided below in Table 7.

TABLE 6

ICL data for battery cell including an electrode screen printed using the water-based graphite-containing paste of Example 3.

| CYCLE | CHARGE mAh/cm² | DISCHARGE mAh/cm² |
|---|---|---|
| 1 | 3.6 | 4.013 |
| 2 | 3.6 | 3.96 |
| 3 | 3.7 | 4.07 |
| 4 | 3.2 | 3.64 |
| 5 | 3.1 | 3.44 |

TABLE 7

ICL data for battery cell including an electrode fabricated using a slot die process with a commercially available slurry containing the same carbon solids used in Example 3.

| CYCLE | CHARGE mAh/cm² | DISCHARGE mAh/cm² |
|---|---|---|
| 1 | 3.0 | 3.2 |
| 2 | 3.0 | 3.2 |
| 3 | 2.9 | 3.1 |
| 4 | 2.9 | 3.1 |
| 5 | 3.0 | 3.2 |

Figure 9:
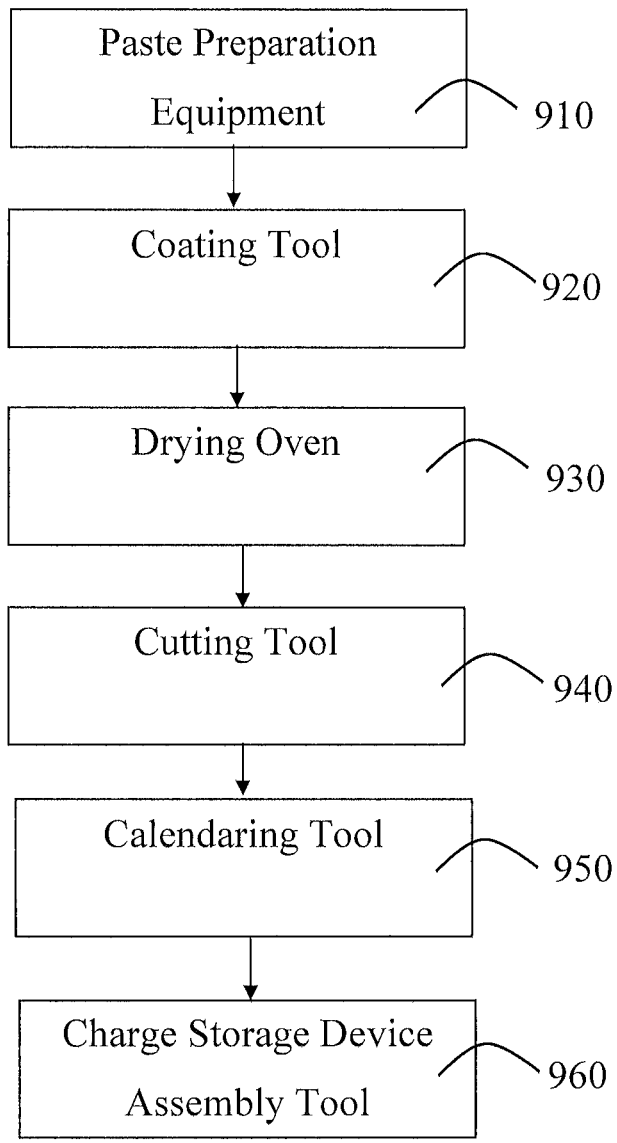
FIG. 9 is a schematic representation of equipment for forming a Li-ion battery, according to some embodiments.

FIG. 9 shows a schematic representation of an example of process tools 910-960 for fabricating a secondary battery electrode. The paste preparation equipment 910 provides a high solids content paste as described above and the equipment may include mixers, such as ceramic roller mixers, which when mixing graphite-containing formulations may be low shear mixers. The coating tool 920 may be a screen printer, for example, and may be configured to coat a current collector such as an aluminum film with the high solids content paste using a roll to roll process; alternatively, separate large substrates may be coated. After coating, the electrodes are passed through a drying oven 930, a cutting tool 940 and a calendaring tool 950, after which the completed electrodes are assembled with second electrodes, electrolytes, etc. to form complete charge storage devices using an assembly tool 960. These tools may be configured for in-line processing.

Although embodiments of the present disclosure have been particularly described with reference to high solids content pastes comprising carbon (graphite) or $LiCoO_2$, other materials may be used in place of, or in addition to the $LiCoO_2$ and carbon (graphite), specifically positive active materials and negative active materials, including those listed herein.

Although embodiments of the present disclosure have been particularly described with reference to certain embodiments thereof, it should be readily apparent to those of ordinary skill in the art that changes and modifications in the form and details may be made without departing from the spirit and scope of the disclosure.

What is claimed is:

1. A high solids content paste for fabrication of secondary battery electrodes, comprising:
    an active material chosen from the group consisting of a negative active material and a positive active material wherein the active material is wetted to form wetted active material;
    a binder;
    a water solvent combined with the binder to form a viscous binder mixture, wherein a low shear mixer is used to combine the viscous binder mixture in the wetted active material to form a paste; and
    a hyperdispersant added to the paste to form the high solids content paste,
    wherein said high solids content paste has a specific viscosity chosen for a particular coating tool and a composition configured for a shelf life having no separation, sedimentation, or coagulation of the high solids content paste and configured such that said high solids content paste maintain its deposited shape after coating at least until said high solids content paste has dried and wherein the dry coating thickness is in the range of 5 microns to 300 microns and the high solids content paste has a viscosity in the range of 34,444 cP to 40,971 cP and a corresponding density of 1.37 to 1.40 g/cc.

2. The high solids content paste of claim 1, wherein said active material is a negative active material comprising graphite particles.

3. The high solids content paste of claim 2, wherein said binder comprises at least one of carboxyl-methyl-cellulose, hydroxy-ethyl-cellulose, poly-methyl-methacrylate and poly-ethyl-methacrylate.

4. The high solids content paste of claim 2, wherein said solvent comprises water.

5. The high solids content paste of claim 4, wherein said high solids content paste has a corresponding density of 1.40 g/cc to 1.43 g/cc.

6. The high solids content paste of claim 1, wherein said active material is positive active material.

7. The high solids content paste of claim 6, wherein said high solids content paste is formulated for use to form a sintered sheet comprising positive active material for use as a substrate for electrochemical energy storage device fabrication.

8. The high solids content paste of claim 7, wherein said sintered sheet of positive active material has a thickness in the range of 3 microns to 260 microns.

9. The high solids content paste of claim 7, wherein said sintered sheet of positive active material has a thickness in the range of 10 microns to 60 microns.

10. The high solids content paste of claim 6, wherein said solvent comprises an organic solvent.

11. The high solids content paste of claim 6, wherein said high solids content paste has a viscosity in the range of 25,479 cP to 47,184 cP and a corresponding density of 2.72 g/cc to 2.73 g/cc.

12. The high solids content paste of claim 6, further comprising carbon solids.

13. A high solids content paste formulated for fabricating a positive electrode of an electrochemical energy storage device, comprising:
    a solid phase mixing of a positive active material and a carbon material to form a solids mixture that is wetted to form a wetted solids mixture;
    one or more binder solids and an organic solvent combined with the binder solvents to form a viscous binder mixture, wherein the viscous binder mixture and the wetted active material are subsequently combined to form a paste; and
    a hyperdispersant added to the paste to form the high solids content paste for the positive electrode to control viscosity of the paste based on a particular coating tool and a composition configured for a shelf life having no separation, sedimentation, or coagulation of the high solids content paste and configured to maintain its deposited shape after coating until the high solids content paste has dried, wherein the high solids content paste has a viscosity in the range of 25,479 cP to 47,184 cP and a corresponding density of 2.72 to 2.73 g/cc.

14. A plurality of high solids content pastes formulated for fabricating electrodes of an electrochemical energy storage device, comprising:

(i) a first high solids content paste for a positive electrode of the electrochemical energy storage device, including:

a solid phase mixing of a positive active material and a carbon material to form a solids mixture that is wetted to form a wetted solids mixture;

a binder solid and an organic solvent combined with the binder solid to form a viscous binder mixture, wherein the viscous binder mixture and the wetted solids mixture are subsequently combined to form a first paste; and a hyperdispersant added to the first paste to form the first high solids content paste for the positive electrode to control viscosity of the first high solids content paste based on a particular coating tool and a composition configured for a shelf life having no separation, sedimentation, or coagulation of the high solids content paste and configured to maintain its deposited shape after coating until the first high solids content paste has dried wherein the first high solids content paste has a viscosity in the range of 25,479 cP to 47,184 cP and a corresponding density of 2.72 to 2.73 g/cc; and (ii) a second high solids content paste for a negative electrode of the electrochemical energy storage device, including:

a negative active material wherein the negative active material is wetted to form wetted negative active material;

a binder and a water solvent combined with the binder to form a viscous binder mixture, wherein a low shear mixer is used to combine the viscous binder mixture and the wetted negative active material to form a second paste; and a hyperdispersant added to the second paste to form the first high solids content paste for the positive electrode to control viscosity of the second high solids content paste based on the particular coating tool and a composition configured for a shelf life having no separation, sedimentation, or coagulation of the high solids content paste and configured to maintain its deposited shape after coating until the second high solids content paste has dried, wherein the second high solids content paste has a viscosity in the range of 25,479 cP to 47,184 cP and a corresponding density of 2.72 to 2.73 g/cc.

* * * * *